United States Patent [19]
Newell et al.

[11] 3,867,555
[45] Feb. 18, 1975

[54] MANUFACTURE OF YEAST PROTEIN ISOLATE HAVING A REDUCED NUCLEIC ACID CONTENT BY AN ALKALI PROCESS

[75] Inventors: Jon Albert Newell, Webster Groves; Ernest Aleck Robbins, High Ridge; Robert Dudley Seeley, Crestwood, all of Mo.

[73] Assignee: Anheuser-Busch, Incorporated, St. Louis, Mo.

[22] Filed: Nov. 29, 1972

[21] Appl. No.: 310,453

[52] U.S. Cl.............. 426/60, 260/112 R, 426/148, 426/204, 426/212, 426/364
[51] Int. Cl.......................... A23j 1/18, A23l 1/28
[58] Field of Search ............ 426/60, 148, 364, 204, 426/212, 279; 260/112 R

[56] References Cited
UNITED STATES PATENTS

| | | | |
|---|---|---|---|
| 3,268,412 | 8/1966 | Champagnat et al.................. | 195/3 |
| 3,585,179 | 6/1971 | Samejima et al. .................. | 260/112 |
| 3,615,654 | 10/1971 | Atukawa et al.......................... | 99/9 |
| 3,634,194 | 1/1972 | Frankenfeld et al.................. | 195/28 |
| 3,681,195 | 8/1972 | Suekane et al. ....................... | 195/4 |
| 3,718,541 | 2/1973 | Kalina................................. | 195/28 |
| 3,725,075 | 4/1973 | Muroi et al. .......................... | 99/14 |

Primary Examiner—James R. Hoffman
Attorney, Agent, or Firm—Gravely, Lieder & Woodruff

[57] ABSTRACT

This disclosure relates to a process for producing a yeast protein isolate (IYP) by treating the protein with alkali under controlled temperature conditions to reduce the nucleic acid (RNA) content of the protein. The yeast cells are ruptured by homogenization; extracted to remove the protein from the cells; and the cell wall debris separated by centrifugation. The solubles fraction (which contains protein and nucleic acid) is treated with alkali in either a high temperature low alkali process (pH 10 to 10.5; temp. 75° to 85°C.; time 1 to 4 hours), or a low temperature high alkali process (pH 11.5 to 12.5; temp. 55° to 65°C.; and time 1 to 2 hours) to hydrolyze the nucleic acid. The protein is acid precipitated and washed to produce a final IYP of low RNA content.

20 Claims, 1 Drawing Figure

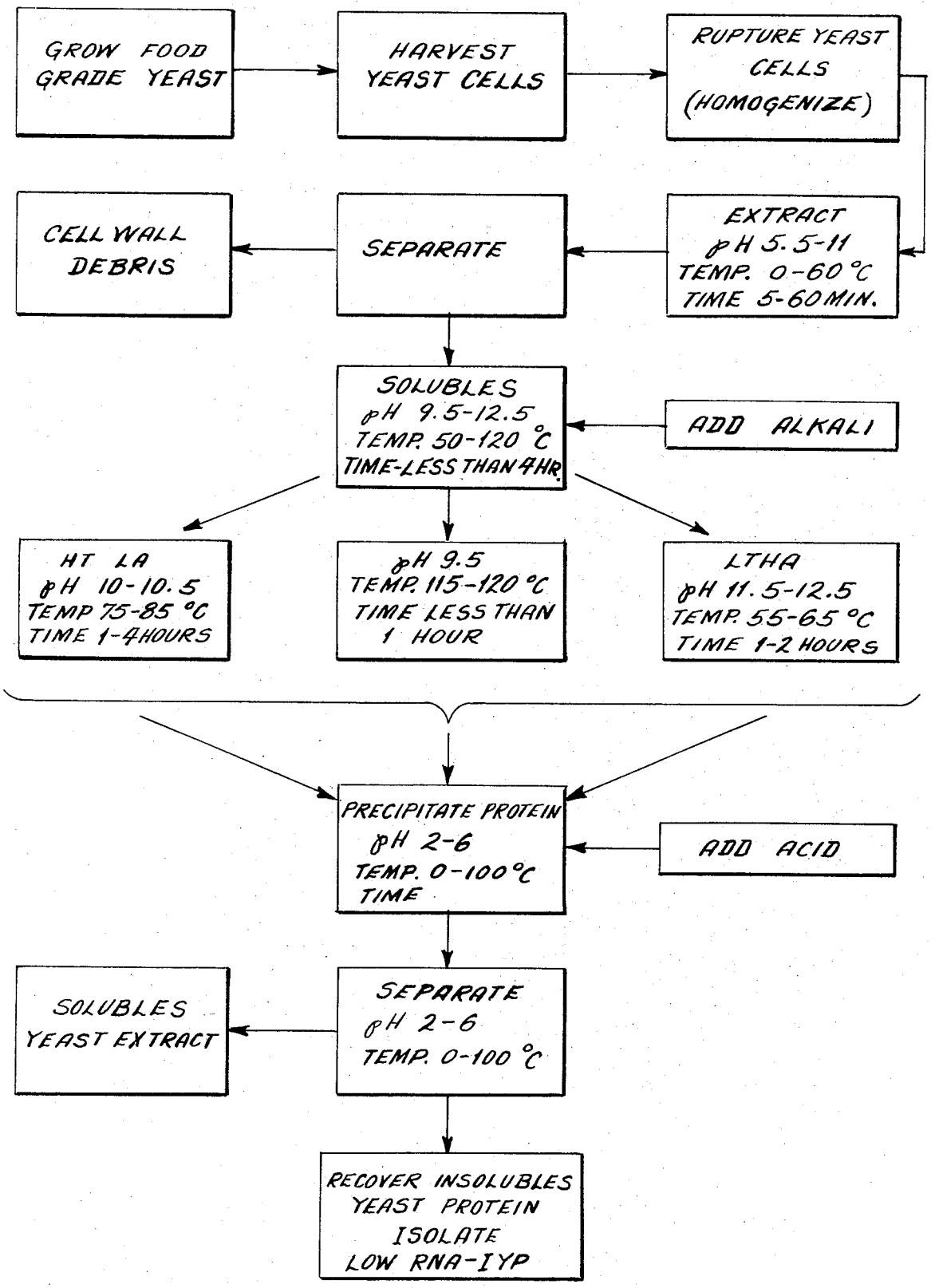

MANUFACTURE OF YEAST PROTEIN ISOLATE HAVING A REDUCED NUCLEIC ACID CONTENT BY AN ALKALI PROCESS

BACKGROUND OF THE INVENTION

There has been considerable information published on the production of microbial protein. The term "microbial protein" has developed two meanings. One meaning connotates the whole cell, in which the protein is contained within the confines of the cell wall and therefore is relatively nonfunctional. The other meaning connotates a protein isolated as a separate entity from the microbe. In either case, for human nutrition, the nucleic acid content of the protein product should be reduced to a lower level, namely below about 9% by weight, if yeast protein is a substantial source of protein in a human diet. The Recommended Daily Allowance of The Food and Nutrition Board, National Research Council, for protein is 65 grams per day for a 70 kilogram adult male. The Protein Advisory Group of the United Nations System recommends that the amount of nucleic acid ingested per day from microbial protein should be less than 2 grams. Therefore, the nucleic acid content of the protein should be less than 6%, if yeast protein supplies 50% of dietary protein. The nucleic acid should be below about 3% if yeast is the sole source of protein in the diet.

The nucleic acid content of yeast cells, such as *Candida utilis* and *Saccharomyces cerevisiae*, is about 12 to 15 grams of nucleic acid per 100 grams of crude protein. Crude protein is calculated for purposes of this application as the Nitrogen (Kjeldahl) content multiplied by 6.25. The protein isolated from these cells also contain 12 to 15 grams nucleic acid per 100 grams of crude protein. Thus, the nucleic acid content should be reduced several fold before a substantial amount of the protein is used for human nutrition. The nucleic acid of yeast is mainly ribonucleic acid or RNA, and in this application these terms will be used interchangeably.

Heretofore alkali has been used to extract the nucleic acids from yeast cells, thereby decreasing the content of the nucleic acid of the cell, so that the nucleic acid to protein ratio of the yeast is decreased. One disadvantage of this process is the concurrent loss of valuable solids, including protein, from the cell with a consequent decrease in protein yield. Another disadvantage is that the protein confined by the cell walls remains in relatively non-functional form.

We have discovered a process by which alkali can be used to prepare a protein product having reduced nucleic acid content in good yield from yeast. The protein product has desirable functional characteristics. Another advantage of our process is that the cell walls of the yeast can be recovered as a valuable product. A still further advantage is that the non-protein soluble cytoplasmic constituents of the cell can be recovered and processed to a valuable product.

Our process is comprised of the following steps: production of yeast cells, rupture of the cells, separation of the insoluble cell wall fragments from the soluble cytoplasmic fraction, treatment of the soluble fraction with alkali, recovery of the low nucleic acid protein by precipitation and centrifugation, vacuum concentration, and drying.

DETAILED DESCRIPTION

Yeast cells (biomass) is produced by methods known to those versed in the art. We prefer to utilize biomass of *Saccharomyces cerevisiae* and *Candida utilis* grown on food grade nutrients in batch and continuous fermentation, but other yeasts are suitable for use in this process. The main considerations are that the yeast be of food grade and produced in good yield.

The biomass is harvested by centrifugation or filtration and water washed. When necessary, dilute alkali may be incorporated in the wash to remove adhering color and taste bodies. The yeast cells are ruptured by any of several known methods, such as high pressure homogenization, attrition in a sand or colloid mill, sonic disintegration, repeated freeze-thaw cycles, lytic enzymes and the like. The main consideration is to rupture the majority of cells under such conditions that the majority of the protein remains in the soluble state, but can be harvested in a later step. The ruptured cell system chomogenate) may be diluted, warmed and pH adjusted to favor processability.

The homogenate is separated by centrifugation and/or filtration into a cell wall residue and an extract usually referred to as the alkali extract. The development of a yeast gylcan from the cell wall residue is described in a copending application (Yeast Glycan and Process of Making Same, Ser. No. 310,452, filed Nov. 29, 1972).

If the protein is recovered by isoelectric precipitation at this stage, the protein will contain high levels of nucleic acid. Such preparations are referred to as a full RNA-IYP. However, if the alkali extract is treated with additional alkali in accordance with the conditions of our invention, then the protein is relatively free of nucleic acid and may be recovered by isoelectric precipitation. The recovered protein product has a desirably low level of nucleic acid and is referred to as low RNA-IYP.

The separation of the low RNA-IYP results in a protein sludge and the soluble cytoplasmic constituents. The soluble cytoplasmic constituents contain the nucleic acid fragments, protein fragments, glycogen, and all of the metabolic intermediates. It can be recognized that the soluble cytoplasmic constituents constitute a valuable fraction of the total microbial system. The harvested low RNA-IYP may be water washed to remove adhering cytoplasmic material. The washed protein product may be dried with or without in vacuo concentration to a powder by spray drying, drum drying, freeze drying and the like.

The recovered low RNA-IYP is substantially cell free and has the following composition: about 65% to about 85% protein; about 0.5 to 9% RNA (preferably 0.5-5% and ideally less than about 3% RN); about 7% to about 15% lipid; about 1% to about 5% ash; about 5% to about 20% carbohydrate; and about 0 to about 1% fiber.

Cell rupture, extraction of solubles, and processability are affected by pH, temperature, time, solids concentration, and homogenizer efficiency. Our usual method of measuring the extent of cell rupture is to determine the amount of nitrogen that remains soluble, i.e., the % N Extractability = 100 ×

$$\frac{g \text{ N in supernate after centrifugation}}{g \text{ N homogenate before centrifugation}}$$

*Candida utilis* biomass after washing has a pH of 4.5-5.5. The biomass is usually chilled, then passed through a Manton-Gaulin homogenizer to a chilled receiver. The process is repeated for a total of three passes. At least three passes are needed to obtain maximum cell rupture. In practice, the biomass is homogenized at the ambient pH of the yeast, namely 4.5–6.5. Cell rupture can also be achieved at a higher pH, up to at least pH 9.5, but the subsequent separation of the cell wall residue from the solubles becomes more difficult.

The effects of pH, solids concentration, and homogenizer efficiency upon the N extractability of *Candida utilis* and on *Saccharomyces cerevisiae* are shown in Tables IA and Table IB.

TABLE IA

Effect of Extraction pH, Solids Level, and Homogenizer Efficiency Upon Nitrogen Extractability of *Candida utilis*

Chilled suspensions of *Candida utilis* at pH 5.0–5.5, 7–10% solids were homogenized by means of Manton-Gaulin homogenizer. The chilled homogenate was recycled through the homogenizer at a pressure of 8000 psig repeatedly to give one, two, three or four pass homogenate. The homogenate was diluted with up to 2.0 parts of water, and adjusted in pH. The diluted homogenates were incubated for 30 min. at 50°C, and then centrifuged. The nitrogen contents of the diluted homogenate, and of the supernate were measured by the Kjeldahl method. % N extractions were calculated.

| pH of Extraction | Solids Content | No. of Passes | % Nitrogen Extracted | Separation of Cell Wall Residue and Solubles |
|---|---|---|---|---|
| 7 | 2.5 | 3 | 76 | Good |
| 8 | 2.5 | 3 | 74 | Good |
| 9 | 2.5 | 3 | 84 | Good |
| 10 | 2.5 | 3 | 82 | Good |
| 11 | 2.5 | 3 | 80 | Good |
| 9.5 | 2.5 | 1 | 70 | Good |
| 9.5 | 2.5 | 2 | 83 | Good |
| 9.5 | 2.4 | 3 | 89 | Good |
| 9.5 | 2.5 | 4 | 91 | Good |
| 9 | 2.4 | 3 | 83 | Good |
| 10 | 2.4 | 3 | 82 | Medium |
| 11 | 2.4 | 3 | 78 | Medium |
| 12 | 2.4 | 3 | 85 | Medium |
| 9 | 6.9 | 3 | 64 | Medium |
| 10 | 6.9 | 3 | 59 | Poor |
| 11 | 6.9 | 3 | 54 | Poor |
| 12 | 6.9 | 3 | 41 | Poor |

TABLE NO. IB

Effect of Extraction pH, Temperature, Time, Solids Content, and Homogenizer Efficiency Upon the Nitrogen Extractability of *Saccharomyces cerevisiae*

Chilled suspensions of commercial baker's yeast at ambient pH of 6–6.5, 7–10% solids, were homogenized by means of a Manton-Gaulin homogenizer at a pressure of 8000 psig. The chilled homogenate was recycled through the homogenizer to give one, two or three passes. The homogenates were diluted with up to two volumes of water and adjusted in pH. The diluted homogenates were incubated for 5–60 minutes at 25–60°C. and centrifuged. The nitrogen contents of the homogenates and supernates after centrifugation were measured by the Kjeldahl method. % N extractions were calculated.

| pH | Solids Content | Time (min.) | °C. Temp. | No. of Passes | % Nitrogen Extractability |
|---|---|---|---|---|---|
| 9.5 | 9.1 | 30 | 25 | 3 | 83 |
| 9.5 | 4.8 | 30 | 25 | 3 | 84 |
| 9.5 | 3.1 | 30 | 25 | 3 | 92 |
| 9.5 | 3.1 | 30 | 25 | 2 | 80 |
| 9.5 | 3.1 | 30 | 25 | 1 | 63 |
| 9.5 | 3–4 | 5 | 50 | 3 | 91 |
| 9.5 | 3–4 | 20 | 50 | 3 | 93 |
| 9.5 | 3–4 | 30 | 50 | 3 | 96 |
| 9.5 | 3–4 | 60 | 50 | 3 | 96 |
| 9.5 | 3–4 | 5 | 60 | 3 | 93 |
| 9.5 | 3–4 | 20 | 60 | 3 | 94 |
| 9.5 | 3–4 | 30 | 60 | 3 | 91 |
| 9.5 | 3–4 | 60 | 60 | 3 | 90 |
| 4.0 | 3–4 | 30 | 25 | 3 | 33 |
| 5.0 | 3–4 | 30 | 25 | 3 | 36 |
| 6.0 | 3–4 | 30 | 25 | 3 | 79 |
| 7.0 | 3–4 | 30 | 25 | 3 | 93 |
| 8.5 | 3–4 | 30 | 25 | 3 | 93 |
| 9.5 | 3–4 | 30 | 25 | 3 | 96 |
| 6.0 | 3–4 | 60 | 60 | 3 | 42 |
| 6.5 | 3–4 | 60 | 60 | 3 | 33 |
| 7.5 | 3–4 | 60 | 60 | 3 | 30 |
| 8.5 | 3–4 | 60 | 60 | 3 | 73 |
| 9.5 | 3–4 | 60 | 60 | 3 | 90 |

The data of Tables IA and IB show that extraction of the soluble nitrogenous materials can be carried out at least over the pH range of about 5.5 to about 11. Process considerations further limit the extraction pH to the range of about 7 to about 10, with pH about 9.5 considered the optimal balance between extraction and subsequent separation of the cell wall residue from the solubles. Extraction is best at a low solids content, but again a consideration of process rated led to the adoption of a solids content of about 2.5% to about 4%. Extraction time can be varied between about 5 and about 60 minutes at extraction temperatures of about 0°C. to about 60°C., preferably 25°–60°C. The best process rate of the subsequent separation of the cell wall residue from the solubles were obtained when the extraction was done at 60°C. for 5 to 20 minutes, at pH 9.5. With *Candida utilis* and *Saccharomyces cerevisiae*, each pass through the homogenizer improved the nitrogen extractability presumably by rupturing more cells, but, again, process rates and equipment must be considered. From 1 to 5 passes can be used, but we prefer a three pass system as a balance between efficiency and economy. The pressure of the homogenizer is about 5000 to about 15000 psig. The temperature is 0° to about 50°C. and preferably 0° to 10°C.

Taking N extractability and process requirements into considerations, the optimal process to produce an extract of the soluble part of the yeast is: (1) growing a food grade yeast on a nutrient media, (2) harvesting and washing the yeast cells, (3) rupturing the yeast cells at a temperature of 0°–10°C., (4) handling the ruptured cells at pH 9.5, at 60°C. for 20 minutes, (5) removing the yeast insolubles at a temperature of about 60°C. The extract containing the soluble part of the yeast is called the alkali extract. Under the optimal conditions, 85–90% of the Kjeldahl N of the homogenate is obtained in the alkali extract. One wash of the cell wall residue increases the extraction yield to 90–95%.

If the alkali extract is adjusted to pH 4.5 at this stage, then the protein product recovered has the same ratio of nucleic acid to protein that exists in yeast, that is 13 to 15 grams of nucleic acid per 100 grams of crude protein. The recovered protein product constitutes a full RNA-IYP. The crude protein nitrogen recovered after the pH 4.5 isoelectric precipitation of the alkali extract has routinely amounted to 75-80% of the crude protein nitrogen present in the alkali extract. The full RNA-IYP from baker's yeast has averaged 81.5% crude protein, 11.7% RNA (dsb); that from *Candida utilis* has averaged 74.6% crude protein, 10.7% RNA (dsb).

The RNA is calculated by the following method

*RNA determination:* About 50 mg. IYP is digested with 5 ml. of 0.2 N KOH for 30 minutes at 100°C. The digest is acidified with 5 ml. $HClO_4$ citrate reagent (0.4 M citrate buffer, pH 2.2 containing 1.7 ml., 70% $HClO_4$ per 100 ml.). The residue is removed by centrifugation. The $A_{260}$ of the suitably diluted supernatant is measured. The extinction coefficient of 31.7 $A_{260}$ ml/mg. is used to calculate RNA. The RNA content is corrected for the $A_{260}$ contribution of protein fragments in the hydrolysate as measured by the Lowry method.

The crude protein is calculated by the Kjeldahl nitrogen method. The total nitrogen of the IYP is measured and multiplied by a factor of 6.25.

The alkali extract was treated with additional alkali up to 0.15 M sodium hydroxide, at temperatures up to 120°C., (preferably about 50°C. to about 120°C.) and for incubation times sufficient to hydrolyze the nucleic acids of the nucleoprotein, thereby allowing the recovery of a protein product containing a reduced content of nucleic acid. This time preferably is less than about 4 hours. The pH is maintained at about 9.5 to about 12.5. The amount of protein recovered was measured to allow the determination of the balance between the nucleic acid content of the protein and the protein yield. The data are presented in Tables IIA and IIB.

TABLES IIA and IIB

Effect of NaOH Concentration, Temperature, & Time on the Hydrolysis of Nucleic Acid & The Protein Recovery from the Soluble Fraction of Yeast The soluble fraction of *Candida utilis* (alkali extract) was prepared as set forth in Example 1. Sodium hydroxide was added to aliquots of the alkali extract. The aliquots were incubated at 60°, 80°, and 100°C. for 1 to 4 hours. The samples were cooled, adjusted to pH 4.5, and centrifuged to yield a protein product and a supernate called acid whey. The samples were analyzed to determine the percent hydrolysis of the nucleic acid and the amount of protein recovered.

TABLE IIA

| NaOH [N] | % Hydrolysis of Nucleic Acid [1] Incubation Temperature | | | | | | | | |
|---|---|---|---|---|---|---|---|---|---|
| | 60°C. | | | 80°C. | | | 100°C. | | |
| | 1hr. | 2hr. | 3hr. | 1hr. | 2hr. | 4hr. | 1hr. | 2hr. | 4hr. |
| 0 | X | X | X | X | X | 36 | X | X | 63 |
| 0.025 | X | X | X | 52 | 67 | 80 | 75 | 78 | 94 |
| 0.05 | 6 | 23 | 46 | 69 | 86 | 81 | 90 | 97 | 100 |
| 0.075 | X | X | X | 83 | 86 | 86 | 90 | 93 | 100 |
| 0.10 | 53 | 82 | 88 | X | X | X | X | X | X |
| 0.15 | 79 | 87 | 91 | X | X | X | X | X | X |

[1] % Nucleic Acid Hydrolysis = 100 × Total $A_{260}$ of Acid Whey of Sample/Total $A_{260}$ of Acid Whey of an aliquot of the alkali extract heated for 30 min.; 100°C.; in 0.2N KOH.

TABLE IIB

| NaOH [N] | % Precipitation Yield [2] | | | | | | | | |
|---|---|---|---|---|---|---|---|---|---|
| | 60°C. | | | 80°C. | | | 100°C. | | |
| | 1hr. | 2hr. | 3hr. | 1hr. | 2hr. | 4hr. | 1hr. | 2hr. | 4hr. |
| 0 | 80 | 81 | 81 | X | X | X | X | X | X |
| 0.025 | X | X | X | 82 | 78 | 74 | 74 | 74 | 65 |
| 0.05 | 79 | 77 | 74 | 73 | 68 | 69 | 62 | 48 | 48 |
| 0.975 | X | X | X | 68 | 65 | 58 | 56 | 52 | 52 |
| 0.10 | 71 | 66 | 64 | X | X | X | X | X | X |
| 0.15 | 67 | 63 | 60 | X | X | X | X | X | X |

[2] [a] % Precipitation Yield = 100 × kjeldahl N content of Alkali Extract-N Content of Acid Whey/Kjeldahl N Content of Alkali Extract

[b] Theoretical yield: a full RNA-IYP is obtained in 80% precipitation yield and contains 10.7 RNA, 74.6% crude protein. If all of the RNA has been hydrolyzed, and is not precipitable, then the precipitation yield cannot be greater than 68%.

Temperatures greater and lesser than those given in Table II have been investigated. At 30°C., incubation for 2 hours at pH 10, 10.5 and 11.0 did not present sufficient RNA hydrolysis. Incubation at 120°C. for 1 hour at pH's 4.5, 5.5, 6.5, 7.5, 8.5 and 9.5, followed by precipitation at pH 4.5 and recovery of the protein gave 14.1, 12.2, 7.8, 5.6, 4.3, and 2.6% RNA (dsb) in the protein product respectively. These data and the data of Table II show that alkalinity, time, and temperature are all related in the recovery of a low RNA-protein product in good yield.

The separation of the protein from the solubles fraction is initiated by the acidification of the incubated product to a pH of about 2 to about 6 (preferably about 3.5 to about 5.5) at a temperature of about 0°–100°C. This causes the protein to precipitate. The solubles fraction is then separated by centrifugation or filtration at approximately the conditions of pH and temperature.

DESCRIPTION OF DRAWING

The drawing is a schematic flow sheet of the process of this invention.

The following are detailed examples of this invention.

EXAMPLE 1

Preparation of a Low RNA-Protein Product from *Candida utilis* by the LTHA Process

*Candida utilis* Biomass was produced in continuous fermentation upon a molasses substrate supplemented with a source of nitrogen and phosphate. The biomass was harvested by centrifugation and washed three times with water.

Fifty gallons of a suspension of *Candida utilis* biomass containing 32.6 pounds of yeast solids, which consisted of 16.1 pounds of crude protein and 2.2 pounds of nucleic acid, were cooled to 45°F. and subjected to homogenization at a pressure of 8000 psig whereafter it was cooled to 45°F. The homogenization was repeated for a total of three passes. The homogenate was diluted to 110 gallons with water and adjusted to pH 9.5 with sodium hydroxide. The material was agitated for 15 minutes, heated to 140°F., and centrifuged. The 140°F. temperature facilitates the separation of the insoluble cell walls and the solubles (called the alkali extract). The separation yielded 12.5 pounds of cell wall solids and 18.1 pounds of alkali extract solids.

The alkali extract was adjusted to 0.1 N is sodium hydroxide by the addition of 10 N NaOH. The pH was about 12. The extract was incubated for 1 hour at 140°F. (60°C.) with gentle agitation. Sufficient 85% phosphoric acid was then added at 140°F. to adjust to pH 4.5. This is called the Low Temperature, High Alkali (LTHA) process. The LTHA process treats the alkali extract at a temperature of about 55° to 65°C. for about 60 to about 120 minutes at a pH of about to about 11.5 – 12.5.

The digest was centrifuged into an insoluble protein product fraction and a solubles fraction, called the acid whey. The protein product was washed once with water. About 9.5 pounds of washed protein solids and 2.5 pounds of wash solids were obtained. The washed protein product was then spray dried. The composition of spray dried protein product (as-is) was: 5.0% moisture, 68.3% crude protein, 1.9% nucleic acid, 6.7% ash, 12.2% fat, 0.3% crude fiber, and 6.1% carbohydrate.

EXAMPLE 2

Preparation of Low RNA-Protein Product from *Candida utilis* by the HTLA Process Alkali extract was prepared in accordance with the procedure set forth in Example 1. The alkali extract was adjusted to 0.025 N NaOH with a resulting pH of 10–10.5. The extract was incubated for four hours at 176°F. (80°C.) with gentle agitation. Sufficient 85% phosphoric acid was then added to adjust to pH 4.5 This is called the High Temperature Low Alkali (HTLA) process. In the HTLA process the temperature is 75° to 85°C.; the pH is 10 to 10.5 and the time is 1 to 4 hrs.

The digest was centrifuged into the protein product and acid whey. The protein product was washed once and spray dried. About 6.1 pounds of washed protein solids were obtained having the composition (as-is): 4.3% moisture, 70% crude protein, 1.0% nucleic acid, 11.3% lipid, and 2.6% ash.

EXAMPLE 3

Preparation of Low RNA-IYP from *Saccharomyces cerevisiae* by the HTLA Process Commercial baker's yeast was used as a source of *Saccharomyces cerevisiae*. The biomass was given three water washes and thickened by centrifugation to 16.1% solids.

The alkali extract and the low RNA-protein product was prepared in accordance with the procedure set forth in Example 2. The composition of the spray dried protein product from baker's yeast: 5.6% moisture, 73.6% crude protein, 3.3% nucleic acid, 11.3% lipid, 5.6% ash, and 4.0% carbohydrate by difference.

The effect of the nucleic acid reduction process on the flavor of the protein product was generally assessed by comparing the taste of a 5% W/W, pH 7 suspension to that of a full RNA-protein product made at the same time. The protein product made by the LTHA process usually had a greater flavor impact than that of the full RNA-protein product. The protein product made by the HTLA process usually had the same or less flavor impact than the full RNA-protein product. In all products, the flavor impact could usually be reduced by in vacuo concentration.

The effect of the nucleic acid reduction processes on the nutritional quality of the protein product is shown in Table III.

TABLE III

Nutritional Quality of Unfractionated *Candida utilis* and of Isolated Yeast Protein (IYP)

Isolated yeast proteins were produced from *Candida utilis* in accordance with the process set forth in Examples 1 and 2. In addition, a full RNA-IYP was prepared according to Example 1 except that the nucleic acid reduction step was omitted. The isolated yeast proteins and the unfractionated yeast were spray dried products.

| Test No. | Material | Nucleic Acid Reduction Step | Product Composition % dsb Corrected[2] Protein | Nucleic Acid | Level of Corrected Protein in the Diet | PER[2] |
|---|---|---|---|---|---|---|
| 1 | C. utilis- Unfractionated | None | 41.6 | 7.6 | 10.0 | 1.47 |
| 2 | C. utilis- Homogenate | None | 33.4 | 5.4 | 10.0 | 1.63 |
| 3 | C. utilis- Homogenate | None | 42.0 | 6.7 | 10.0 | 1.70 |
| 4 | C. utilis- Homogenate | None | 40.5 | 6.0 | 10.0 | 1.62 |
| 5 | Full RNA-IYP | None | 62.4 | 10.2 | 10.0 | 1.60 |

TABLE III—Continued

Nutritional Quality of Unfractionated *Candida utilis* and of Isolated Yeast Protein (IYP)

Isolated yeast proteins were produced from *Candida utilis* in accordance with the process set forth in Examples 1 and 2. In addition, a full RNA-IYP was prepared according to Example 1 except that the nucleic acid reduction step was omitted. The isolated yeast proteins and the unfractionated yeast were spray dried products.

| Test No. | Material | Nucleic Acid Reduction Step | Product Composition % dsb Corrected[2] Protein | Nucleic Acid | Level of Corrected Protein in the Diet | PER[3] |
|---|---|---|---|---|---|---|
| 6 | Full RNA-IYP | None | 65.4 | 11.5 | 10.0 | 1.55 |
| 7 | Low RNA-IYP | MSE[1] | 67.4 | 1.4 | 10.0 | 1.64 |
| 8 | Low RNA-IYP | LTHA | 68.0 | 1.6 | 10 | 0.51 |
| 9 | Low RNA-IYP | LTHA | 68.0 | 1.6 | 12.5 | 0.71 |
| 10 | Low RNA-IYP | LTHA | 68.0 | 1.6 | 15.0 | 0.83 |
| 11 | Low RNA-IYP | LTHA | 70.0 | 2.0 | 10 | 0.41 |
| 12 | Low RNA-IYP + Meth. (4) | LTHA | 70.0 | 2.0 | 10 | 1.87 |
| 13 | Low RNA-IYP | HTLA | 71.2 | 2.0 | 10 | 0.71 |
| 14 | Casein (ANRC) | X | X | X | 7.5 | 2.40 |
| 15 | Casein | X | X | X | 10.0 | 2.50 |
| 16 | Casein | X | X | X | 12.5 | 2.31 |
| 17 | Casein | X | X | X | 15.0 | 2.10 |

[1] In accordance with our copending application Newell et al. "A Process of Making Yeast Protein Isolate Having Reduced Nucleic Acid Content". This process uses malt sprout extract (MSE) to hydrolyze the nucleic acid in the alkali extract before the protein is separated. This produces an IYP having low RNA content.
[2] Corrected protein = 6.25 (Total N by Kjeldahl - % Nucleic Acid Content/6.13)
[3] The Protein Equivalence Ratio (PER) was measured by WARF, Inc. calculated to a PER = 2.5 for ANRC casein at 10% level in the diet.
[4] 0.2% methionine was incorporated into the diet.

The reproducibility of the nutritional quality of the materials is apparent from the comparisons among Tests Nos. 2, 3 and 4; between 5 and 6; and between 8 and 11. The nutritional quality of the full RNA-IYP is equivalent to the yeast homogenate from which the IYP is made. Test No. 7 shows that a low RNA-IYP can be made without reduction in nutritional quality. The alkali treatments to reduce the nucleic acid content does reduce the nutritional quality, but the nutritional quality was improved by the addition of methionine.

Table IV shows the essential amino-acid composition of the isolated yeast protein products. The full RNA-IYP (Tests No. 5 and No. 6) and the low RNA-IYP made by our Malt Sprout Extract process (Test No. 7) are especially rich in all of the essential amino acids except for the sulfur containing amino acids. Except for methionine and cystine, the contents of the essential amino acids exceeds that cited for the FAO reference protein (FAO Committee on Protein Requirements (1957b) "FAO Nutritional Studies No. 16") and meets or exceeds that needed for the growing rat.

The low RNA-IYP's made by the HTLA and LTHA processes also exceed the essential amino acid content of the FAO reference pattern except for methionine and cystine. The essential amino acid requirements for the growing rat are also met or exceeded except for methionine, cystine, and lysine. The available lysine content is equal to that of casein.

Alkali effects on the nutritional quality of proteins is not understood completely, but may be the result in part of modifications involving cystine, lysine, arginine and possibly serine, and to the racemization of threonine. The available lysine content of the low RNA-IYP (Test No. 8) is identical to that for the full RNA-IYP (Test No. 5) and stands in the same relationship of the total lysine. Threonine was not affected as evidenced by the comparison of column and mba values. Cystine, but not methionine, content was decreased by the LTHA and HTLA treatments. Because methionine can replace cystine in the diet, the addition of methionine to the low RNA-IYP would be expected to increase the nutritional quality. The addition of 0.2% methionine to the diet (2.0% methionine on a protein basis) did improve the nutritional quality (Test No. 12, Table III) of the low RNA-IYP made by the LTHA process. The sulfur containing amino acids can be supplied as the isolated amino acid, or as a mixture with a protein rich in cystine or methionine, such as wheat protein.

TABLE IV

Essential Amino Acid Composition of Isolated Yeast Protein from *Candida utilis*

Grams of Amino Acid per 100 Grams Corrected protein

| Amino Acid | Method[1] of Detn. | Method of RNA Reduction | | | | | | ANRC[3] Casein | FAO[4] | Amino Acid[5] Pattern Req'd by the Growing Rat |
|---|---|---|---|---|---|---|---|---|---|---|
| | | None No. 5 | No. 6 | MSE[2] No. 7 | LTHA No. 8 | No. 11 | HTLA No. 13 | | | |
| Lysine | Column | 8.46 | 9.56 | 8.70 | 9.60 | 8.12 | 7.86 | 8.0 | 4.2 | 9.0 |
| Lysine | mba | 9.05 | X | X | 9.00 | X | X | X | X | X |
| Lysine | "Available" | 7.95 | X | X | 7.92 | X | X | X | X | X |
| Methionine | mba | 1.35 | 1.32 | 1.36 | 1.67 | 1.41 | 1.30 | 2.84 | 2.2 | 1.6 |
| Cystine | mba | 0.68 | 1.28 | 1.34 | 0.25 | 0.56 | 0.42 | 0.52 | 2.0 | 3.4 |
| Threonine | Column | 5.25 | 5.42 | 5.40 | 5.00 | 4.95 | 5.05 | 3.52 | 2.8 | 5.0 |
| Threonine | mba | 5.40 | X | X | 4.84 | X | X | X | X | X |
| Tryptophan | Column | 1.37 | 1.35 | 1.53 | 1.59 | 1.47 | 1.39 | 1.27 | 1.4 | 1.1 |
| Valine | Column | 6.41 | 6.46 | 6.60 | 6.29 | 6.38 | 6.34 | 7.12 | 4.2 | 5.5 |

TABLE IV – Continued

Essential Amino Acid Composition of Isolated Yeast Protein from *Candida utilis*

Grams of Amino Acid per 100 Grams Corrected protein

| Amino Acid | Method[1] of Detn. | Method of RNA Reduction | | | | | | ANRC[3] Casein | FAO[4] | Amino Acid[5] Pattern Req'd by the Growing Rat |
|---|---|---|---|---|---|---|---|---|---|---|
| | | None No. 5 | No. 6 | MSE[2] No. 7 | LTHA No. 8 | No. 11 | HTLA No. 13 | | | |
| Phenylalanine | Column | 5.33 | 5.26 | 5.57 | 5.36 | 5.40 | 5.32 | 5.02 | 2.8 | 4.2 |
| Leucine | Column | 9.29 | 9.48 | 9.68 | 9.41 | 9.34 | 9.26 | 9.65 | 4.8 | 7.0 |
| Isoleucine | Column | 5.75 | 6.06 | 6.05 | 5.88 | 5.70 | 5.80 | 4.85 | 4.2 | 5.5 |
| Tyrosine | Column | 6.39 | 4.59 | 4.85 | 4.43 | 4.42 | 4.74 | 5.55 | 2.8 | 3.0 |
| Histidine | Column | 2.51 | 3.20 | 2.67 | 2.80 | 2.54 | 2.38 | 3.20 | X | 2.5 |

[1]The amino acid contents were determined by WARF, Inc. by the amino acid analyzer (column), by microbiological assay (mba), and by USP XVIII, 947 (1970) (Available).
[2]Malt Sprout Extract - See footnote No. 1 of Table III.
[3]Amino Acid analysis of ANRC casein.
[4]FAO Committee on Protein Requirements (1957 b) "FAO Nutritional Studies" No. 16.
[5]P.B. Ramo Rao, H.W. Norton, and B. Connor Johnson, J. Nutrition, 82, p 88 (1964).

What is claimed is:

1. A process for producing a yeast protein product comprising the steps of:
   a. Rupturing yeast cells,
   b. Separating a solubles fraction containing the nucleic acid and protein from an insoluble cell wall debris fraction,
   c. Hydrolyzing the nucleic acid with alkali at a pH of about 9.5 to about 12.5 and a temperature of about 50°C. to about 120°C. for less than 4 hours,
   d. Precipitating the protein by the addition of acid to a pH of about 2 to about 6 and a temperature of 0°–100°C., and
   e. Separating the insoluble protein produced from the nucleic acid containing solubles part.

2. The process of claim 1 wherein the yeast cells are ruptured by homogenization below about 50°C.

3. The process of claim 1 wherein the ruptured yeast cells are extracted at a pH between about 5.5 and about 11 and a temperature between about 25°C. and about 60°C. for about 5 to about 60 minutes.

4. The process of claim 3 wherein the ruptured yeast cells are extracted at pH 9.5 at a temperature between 25°C. and 60°C. for 5 to 60 minutes.

5. The process of claim 3 wherein the ruptured yeast cells are extracted at pH 9.5, 60°C., for 30 minutes.

6. The process of claim 1 wherein the insoluble cell wall material is separated by centrifugation.

7. The process of claim 1 wherein the solubles fraction after the separation of the cell wall debris is treated with alkali at a pH between about 9.5 and about 12.5, a temperature between about 50°C. and about 120°C., for up to 4 hours.

8. The process of claim 7 wherein the solubles fraction is treated with alkali at a pH of 10.0 to 10.5, a temperature of 75°–85°C., for a time of 1 to 4 hours.

9. A process according to claim 7 wherein the solubles fraction is treated with alkali at a pH of 11.5–12.5, a temperature of 55°–65°C., for a time of 1 to 2 hours.

10. A process according to claim 7 wherein the solubles fraction is treated with alkali at pH 9.5 at 115°–120°C. for not greater than 1 hour.

11. A process according to claim 1 wherein the protein product is precipitated by the addition of acid to a pH between about 3.5 and about 5.5, at a temperature between about 5°C. and about 90°C.

12. A process according to claim 11 wherein the protein product is precipitated by the addition of hydrochloric or phosphoric acid to pH about 4.0 to about pH 5.0 at a temperature between about 50°C. and about 80°C.

13. The process according to claim 12 wherein the precipitated protein is recovered by centrifugation at pH about 4.0 to about 5.0 at a temperature between about 50°C. and about 80°C.

14. The process of claim 13 wherein the recovered yeast protein contains less than about 5% RNA.

15. The process of claim 13 wherein the recovered yeast protein contains less than about 3% RNA.

16. The process according to claim 1 wherein the precipitated protein is recovered by centrifugation at pH about 4.0 to about 5.9 at a temperature between about 0° and about 100°C.

17. A process according to claim 16 wherein the recovered protein is concentrated and deflavored in vacuo.

18. A process according to claim 17 in which the food grade yeast is selected from the strain of *Saccharomyces cerevisiae* and *Candida utilis*.

19. The process of claim 1 including the step of recovering a yeast protein product comprising:
    about 65% to about 85% protein;
    about 0.5% to about 9% RNA;
    about 7% to about 15%; lipid; about 1 to about 5% ash; about 5 to about 20% carbohydrate; and about 0% to about 1% fiber.

20. A process comprising the steps of:
    a. Growing a food grade yeast on nutrient media,
    b. Harvesting and washing the yeast cells,
    c. Rupturing the yeast cells at a temperature between 0° and 50°C.,
    d. Holding the ruptured cells at a pH between about 7.0 and about 11.0 at a temperature not greater than about 70°C. for a time not greater than about 5 minutes,
    e. Removing the yeast insolubles at a temperature not greater than about 75°C.,
    f. Incubating the yeast solubles at a temperature of about 80°C. and at a pH between about 10.0 and about 10.5 for a time sufficient to decrease the nucleic acid content of the harvested protein,
    g. Precipitating the protein by the addition of a food grade acid to pH about 4.0 to pH about 5.0, and
    h. Removing the yeast protein at a temperature between about 0°C. and about 80°C.

* * * * *